(12) United States Patent
Gove et al.

(10) Patent No.: US 12,372,655 B2
(45) Date of Patent: Jul. 29, 2025

(54) THROUGH-DISPLAY TIME-OF-FLIGHT (ToF) SENSOR

(71) Applicant: Synaptics Incorporated, San Jose, CA (US)

(72) Inventors: Robert John Gove, Los Gatos, CA (US); Michael Charles Brading, Milpitas, CA (US)

(73) Assignee: Synaptics Incorporated, San Jose, CA (US)

( * ) Notice: Subject to any disclaimer, the term of this patent is extended or adjusted under 35 U.S.C. 154(b) by 1200 days.

(21) Appl. No.: 17/177,588

(22) Filed: Feb. 17, 2021

(65) Prior Publication Data

US 2021/0258498 A1 Aug. 19, 2021

Related U.S. Application Data

(60) Provisional application No. 62/978,249, filed on Feb. 18, 2020.

(51) Int. Cl.
| | | |
|---|---|---|
| *G01S 17/89* | (2020.01) | |
| *G01S 17/894* | (2020.01) | |
| *G06F 3/03* | (2006.01) | |
| *G06V 10/141* | (2022.01) | |
| *G06V 10/764* | (2022.01) | |
| *G06V 10/82* | (2022.01) | |
| *G06V 40/16* | (2022.01) | |

(52) U.S. Cl.
CPC ............ *G01S 17/894* (2020.01); *G01S 17/89* (2013.01); *G06F 3/0304* (2013.01); *G06V 10/141* (2022.01); *G06V 10/764* (2022.01); *G06V 10/82* (2022.01); *G06V 40/16* (2022.01)

(58) Field of Classification Search
CPC ...... H04N 5/2321; H04N 23/71; G01S 17/89; G01S 17/894; G01S 7/4802; G01S 7/4813; G06F 3/0304; G06V 10/764; G06V 10/141; G06V 10/82; G06V 40/16; G01B 11/026; G01B 11/24; G06N 3/08
USPC ....................................................... 356/5.04
See application file for complete search history.

(56) References Cited

U.S. PATENT DOCUMENTS

| | | | | |
|---|---|---|---|---|
| 10,676,085 B2 * | 6/2020 | Smith | ............... | B60W 30/0956 |
| 11,516,374 B2 * | 11/2022 | Gove | .................. | H04N 5/2226 |
| 11,675,359 B2 * | 6/2023 | Towal | .................. | G06V 20/588 |
| | | | | 701/23 |

OTHER PUBLICATIONS

Su et al., "Deep End-to-End Time-of-Flight Imaging," CVPR, pp. 1-10, 2018.

* cited by examiner

*Primary Examiner* — Daniel L Murphy
(74) *Attorney, Agent, or Firm* — Paradice & Li LLP

(57) ABSTRACT

A depth sensing system including an electronic display, a light source, an array of optical sensing elements, and a depth map generator. The light source is configured to transmit periodic bursts of light in a field of view (FOV) of the depth sensing system. The array of optical sensing elements is disposed behind the electronic display and configured to detect light reflected from one or more objects in the FOV of the depth sensing system, where the reflected light is partially occluded by the electronic display. The depth map generator is configured to receive sensor data based on the detected light form the array of optical sensing elements and determine depth information about the one or more objects by applying one or more neural network models to the received sensor data.

20 Claims, 14 Drawing Sheets

THROUGH-DISPLAY TIME-OF-FLIGHT (ToF) SENSOR

CROSS-REFERENCE TO RELATED APPLICATION

This application claims priority and benefit under 35 USC § 119 (e) to U.S. Provisional Patent Application No. 62/978,249, filed on Feb. 18, 2020, which is incorporated herein by reference in its entirety.

TECHNICAL FIELD

The present embodiments relate generally to time-of-flight (ToF) sensors, and specifically to ToF sensors integrated behind electronic displays.

BACKGROUND OF RELATED ART

Depth sensors are commonly used to measure the depths or distances of objects in an environment. A time-of-flight (ToF) sensor is a particular type of depth sensor that determines the distances of objects in its vicinity by measuring the time for light to travel from the sensor, to an object, and (after reflection) back to the sensor. The ToF sensor may include a light source to transmit the light in a direction of the object and one or more light receptors to detect and/or capture the reflected light from the object. The light receptors may be located adjacent to (or in close proximity of) the light source to ensure a relatively accurate timing relationship between the transmitted light and the reflected light. The ToF sensor may then calculate the distance to the object based on a timing relationship between the transmitted light and the reflected light (e.g., using known properties of light).

Some electronic devices, including smartphones, tablets, laptops, and the like, implement depth sensors for purposes of biometric authentication (such as face recognition). Some depth sensors are coplanar with a display of the device, for example, to authenticate the user in a natural or nonintrusive manner. The depth sensor is often disposed within a region of the device that provides an unobstructed view of the environment. Thus, when integrated on the same surface or plane as the display, the depth sensor is often disposed within a notch or cutout of (or adjacent to) the display. This results in a large, unsightly black border around the display which may detract from the device's appearance and limit the device's screen-to-body ratio.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a depth sensing system including an electronic display, a light source, an array of optical sensing elements, and a depth map generator. The light source is configured to transmit periodic bursts of light in a field of view (FOV) of the depth sensing system. The array of optical sensing elements is disposed behind the electronic display and configured to detect light reflected from one or more objects in the FOV of the depth sensing system, where the reflected light is partially occluded by the electronic display. The depth map generator is configured to receive sensor data based on the detected light from the array of optical sensing elements and determine depth information about the one or more objects by applying one or more neural network models to the received sensor data.

Another innovative aspect of the subject matter of this disclosure can be implemented in a method of depth sensing. The method includes steps of transmitting periodic bursts of light in a field of view (FOV) of the electronic device; detecting light reflected from one or more objects in the FOV of the electronic device, where the reflected light is partially occluded by an electronic display of the electronic device; generating sensor data based on the detected light; and determining depth information about the one or more objects by applying one or more neural network models to the sensor data.

Another innovative aspect of the subject matter of this disclosure can be implemented in a depth measuring system including a processing system and a memory. The memory stores instructions that, when executed by the processing system, causes the depth measuring system to receive sensor data based on light reflected from one or more objects, where the reflected light is partially occluded by an electronic display; generate a depth map associated with the one or more objects based on the received sensor data; and determine depth information about the one or more objects by applying one or more neural network models to the depth map.

BRIEF DESCRIPTION OF THE DRAWINGS

The present embodiments are illustrated by way of example and are not intended to be limited by the figures of the accompanying drawings.

DETAILED DESCRIPTION

Figure 1:
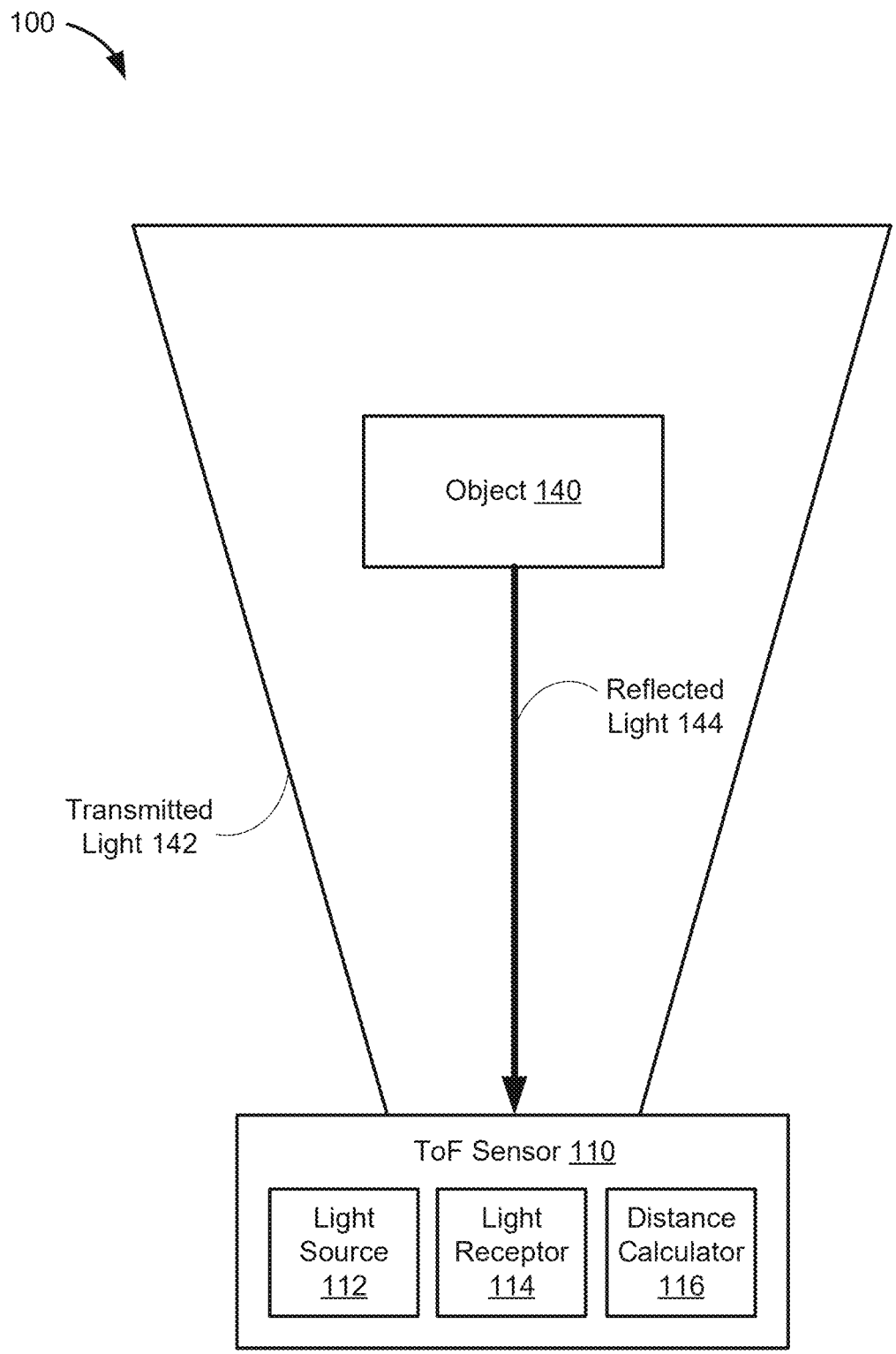
FIG. 1 shows an example environment within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general-purpose processor, special purpose processor, conventional processor, controller, microcontroller, and/or state machine capable of executing scripts or instructions of one or more software programs stored in memory.

Various implementations relate generally to depth sensing systems. Some implementations more specifically relate to acquiring depth information via a time-of-flight (ToF) sensor disposed behind an electronic display. In some implementations, the ToF sensor includes a light source, an array of optical sensors, and a depth map generator. The light source is configured to transmit periodic bursts of light in a direction of one or more objects. The array of optical sensing elements is disposed behind the electronic display and configured to detect light reflected from the one or more objects, where the reflected light is partially occluded by the electronic display. The depth map generator is configured to receive sensor data corresponding to the detected light from the array of optical sensing elements and determine depth information of the one or more objects based at least in part on one or more neural network models.

Particular implementations of the subject matter described in this disclosure can be implemented to realize one or more of the following potential advantages. In some implementations, the described techniques can be used to enable depth sensing through an electronic display. For example, by using neural networks trained to recognize the noise or interference caused by an electronic display, as well as other distortions such as flying pixels, dead pixels (in the sensor), lens distortions, illumination distortions and/or non-uniformities, aspects of the present disclosure may filter such noise or interference from images captured by a ToF sensor disposed behind the electronic display. Such placement of the ToF sensor may improve user experience by eliminating unsightly black borders, cutouts, or notches in the bezel of the electronic display while still allowing the ToF sensor to be used for biometric authentication in a natural or nonintrusive manner. Further, the use of neural networks may enable the ToF sensor to determine the distances of objects in a manner that is less computationally intensive compared to the complex trigonometric calculations performed by existing ToF sensors.

FIG. 1 shows an example environment 100 within which the present embodiments may be implemented. The environment 100 includes a time-of-flight (ToF) sensor 110 and an object 140 located within sensing range of the ToF sensor 110 (e.g., within the sensor's field of view). The ToF sensor 110 may be configured to determine depth information (e.g., distances) of nearby objects by illuminating the sensor's field of view and measuring the light reflected off the objects (such as object 140). In some implementations, the ToF sensor may be configured to determine the depth information based on indirect (or phased) ToF sensing techniques. The ToF sensor 110 includes a light source 112, a light receptor 114, and a distance calculator 116.

The light source 112 is configured to emit (or "transmit") light 142 in a direction of the object 140. For example, the light source 112 may include one or more illumination mechanisms including, but not limited to, lasers, light-emitting diodes (LEDs), and/or any other mechanisms capable of emitting wavelengths of light in the visible spectrum, the infrared spectrum, or the ultraviolet spectrum. The light receptor 114 may be configured to detect (or "receive") light 144 reflected back from the object 140. For example, the light receptor 114 may include an array of pixel sensors including, but not limited to, photodiodes, CMOS image sensor arrays, CCD arrays, and/or any other sensors capable of detecting wavelengths of light in the visible spectrum, the infrared spectrum, or the ultraviolet spectrum. The light receptor 114 may be located adjacent to (or in close proximity of) the light source 112 to ensure that the distance traveled by the transmitted light 142 is substantially equal to the distance traveled by the reflected light 144.

The distance calculator 116 is configured to determine a distance between the ToF sensor 110 and one or more objects in the path of the transmitted light 142 (such as object 140) based, at least in part, on a round-trip time (RTT) of the transmitted light. For example, the distance calculator 116 may calculate the distance of the object 140 based on a difference in timing between the transmission of the transmitted light 142 and the reception of the reflected light 144 (e.g., since the speed of light is a known quantity). As described in greater detail below, some ToF sensors rely on complex trigonometric functions, which are computationally intensive and produce relatively imprecise depth information, in calculating the distance of the object 140. In some embodiments, the distance calculator 116 may use one or more neural network models to determine the distance of the object 140 based on sensor data captured by the light receptor 114, thereby avoiding such complex trigonometric calculations.

In some embodiments, the ToF sensor 110 may be integrated with a display of an electronic system or device (not shown for simplicity). More specifically, one or more components of the ToF sensor 110 may be "hidden" behind or under the display to provide an improved user experience. For example, such placement of the ToF sensor 110 may eliminate the need for unsightly black borders, cutouts, or notches in the bezel of the display. In some aspects, at least the light receptor 114 is disposed or positioned behind the display. In this configuration, the sensor's field-of-view (FOV) may be partially obstructed by display pixels and/or sub-pixels in the electronic display. In other words, the light incident upon the light receptor 114 may depend, at least in part, on the transmissivity and dispersion of the electronic display. Aspects of the present disclosure recognize that some display technologies (such as organic light-emitting diode (OLED) and micro-LED) provide partially transmissive "gaps" or empty spaces between display pixels and/or sub-pixels which allow at least some light to filter through. However, the image captured by the light receptor 114 may exhibit noise or interference as a result of the reflected light 144 being partially occluded by the display.

In some embodiments, the distance calculator 116 may use one or more neural network models to filter the noise or interference from the images captured by the light receptor 114. For example, the neural network models may be trained to infer (and reject) noise or interference that is attributable to light passing through the electronic display. The resulting images may thus be suitable for depth sensing and/or other image processing. For example, in some implementations, the filtered images may be used for purposes of biometric authentication (e.g., facial recognition). Among other advantages, the present embodiments may allow larger displays to be implemented in electronic systems or devices (such as edge-to-edge or "infinity" displays) without sacrificing depth sensing functionality or increasing the size or footprint of the device.

Figure 2:
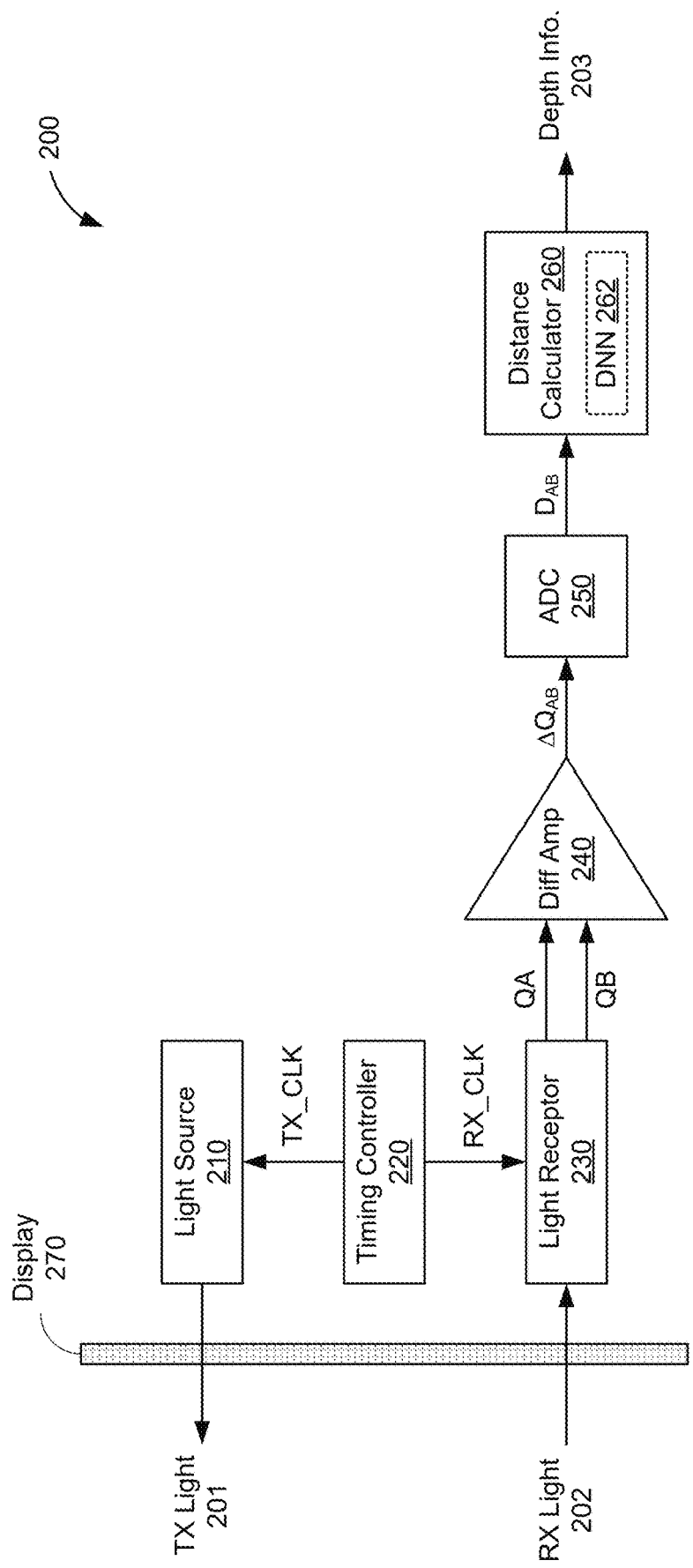
FIG. 2 shows a block diagram of a depth sensing system, in accordance with some embodiments.

FIG. 2 shows a block diagram of a depth sensing system 200, in accordance with some embodiments. The depth sensing system 200 may be an example embodiment of the ToF sensor 110 of FIG. 1. Thus, the depth sensing system 200 may be configured to determine depth information of nearby objects by illuminating the sensor's field of view and measuring the light reflected off the objects.

The depth sensing system 200 includes a light source 210, a timing controller 220, a light receptor 230, a differential amplifier (diff amp) 240, an analog-to-digital converter (ADC) 250, and a distance calculator 260. The light source 210 may be an example embodiment of the light source 112 of FIG. 1. Thus, the light source 210 may be configured to emit or transmit (TX) light 201 in a direction of the sensor's field of view. The light receptor 230 may be an example embodiment of the light receptor 114 of FIG. 1. Thus, the light receptor 230 may be configured to detect or receive (RX) light 202 reflected back from one or more objects in the sensor's field of view (e.g., in the path of the TX light 201). In the embodiment of FIG. 2, the light source 210 and the light receptor 230 are both disposed behind an electronic display 270, such that the TX light 201 and the RX light 202 exit and enter the depth sensing system 200 through partially transmissive gaps or empty spaces between display pixels and/or sub-pixels in the display 270. However, in some other implementations, the light source 210 may be coplanar with, or adjacent to, the electronic display 270.

The timing controller 220 may control a timing of the light source 210 and the light receptor 230 via control signals TX_CLK and RX_CLK, respectively. In operation, the timing controller 220 may repeatedly strobe the light source 210 (e.g., by driving TX_CLK) to periodically transmit "bursts" of TX light 201 in rapid succession. At least some of the transmitted light 201 may be reflected by an object (such as object 140 of FIG. 1) and returned to the depth sensing system 200 as the RX light 201. The timing controller 220 may further activate or turn "on" the light receptor 230 (e.g., by driving RX_CLK) to detect and/or capture the RX light 202. In some implementations, the light receptor 230 may comprise an array of optical sensing elements or "pixels" operated (electrically) in a global shutter configuration. In other words, when the light receptor 230 is activated (e.g., the global shutter is "open") the pixels in the array are concurrently exposed to the RX light 202. When the light receptor 230 is deactivated (e.g., the global shutter is "closed") the pixels in the array are concurrently disabled from receiving any subsequent RX light 202.

During a given exposure cycle (e.g., while the global shutter is open), the light receptor 230 converts the RX light 202 to an electric charge or current that is stored on one or more storage elements within each pixel of the array. The charge may be accumulated over a number of exposure cycles so that a sufficiently high voltage differential can be read from the storage elements. When the global shutter is open, the pixels may be exposed to background illumination in addition to reflections of the TX light 201. Thus, to prevent overexposure of the pixels to background illumination, the timing controller 220 may lock the timing of the exposure cycles to coincide with the timing of the bursts of TX light 201 (e.g., as described in greater detail with respect to FIG. 3).

Figure 3:
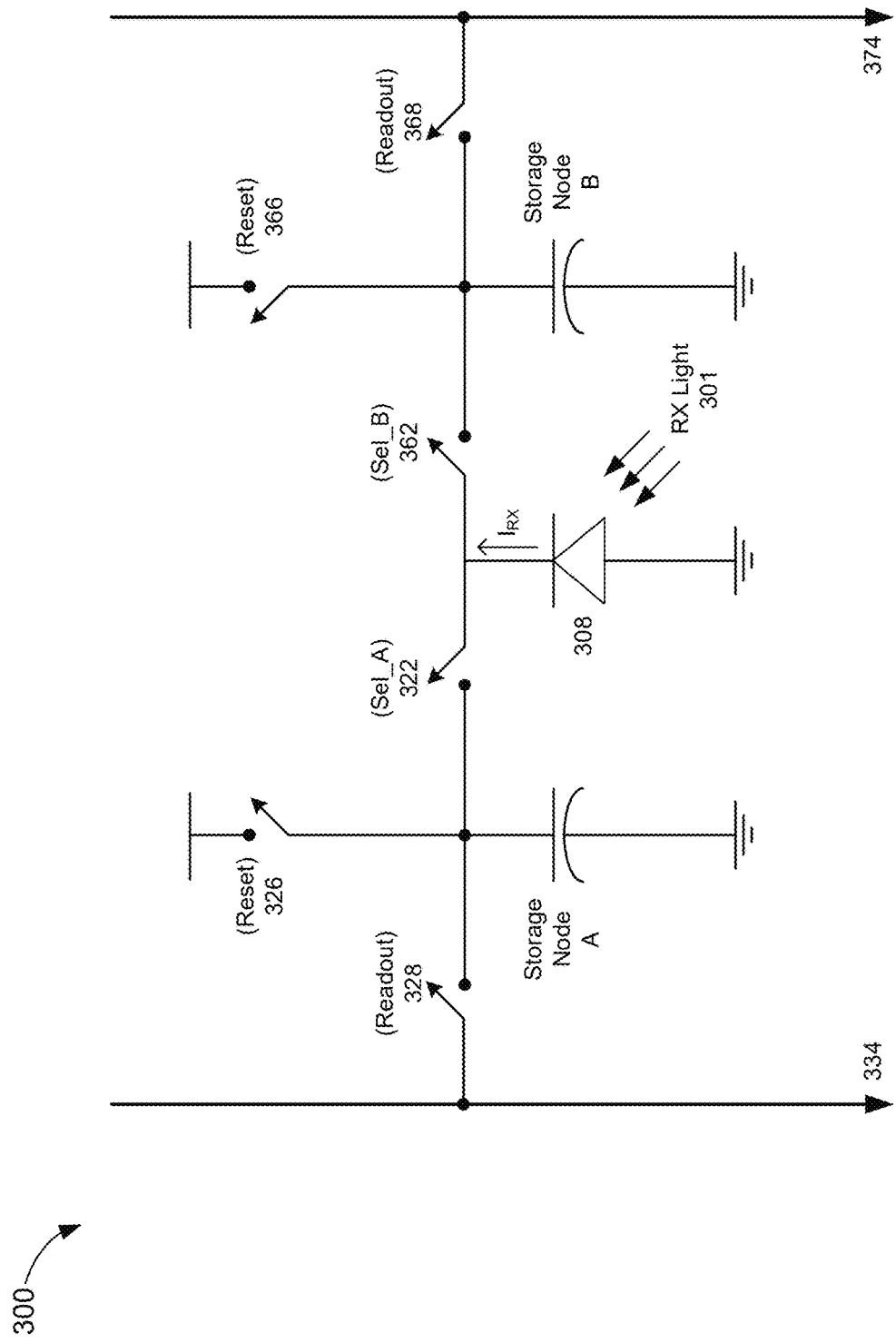
FIG. 3 shows an example pixel structure for a light receptor of a time-of-fight (ToF) sensor.

FIG. 3 shows an example pixel structure 300 for a light receptor of a ToF sensor. For example, the pixel structure 300 may be an embodiment of one of a plurality of similar or identical pixel structures contained within the light receptor 230. The pixel structure 300 includes a photodiode 308, a first storage node (A), and a second storage node (B). In the example of FIG. 3, the storage nodes A and B are depicted as capacitors. However, in actual implementations, the storage nodes A and B may be implemented using any circuitry capable of storing electric charge.

The photodiode 308 converts incident (RX) light 301 to an electrical current ($I_{Rx}$). With reference for example to FIG. 2, the RX light 301 may correspond to the RX light 202 received by the light receptor 230. The photodiode 308 is switchably coupled to the storage nodes A and B via respective switches 322 and 362. Switch 322 may be controlled by a first select signal (Sel_A) and switch 362 may be controlled by a second select signal (Sel_B). In some implementations, only one of the switches 322 or 362 may be closed at any given time. More specifically, one of the switches 322 or 362 may be closed any time the light receptor is activated (e.g., where the closing of one of the switches 322 or 362 effectively "opens" the global shutter) to allow an accumulation of charge on a corresponding one of the storage nodes A or B. When the light receptor is deactivated, both of the switches 322 and 362 are open (e.g., where the opening of both switches 322 and 362 effectively "closes" the global shutter) to stop the accumulation of charge on the storage nodes A and B. The timing of the switches 322 and 362 may be controlled by a timing controller (such as the timing controller 220 of FIG. 2).

Figure 4A:
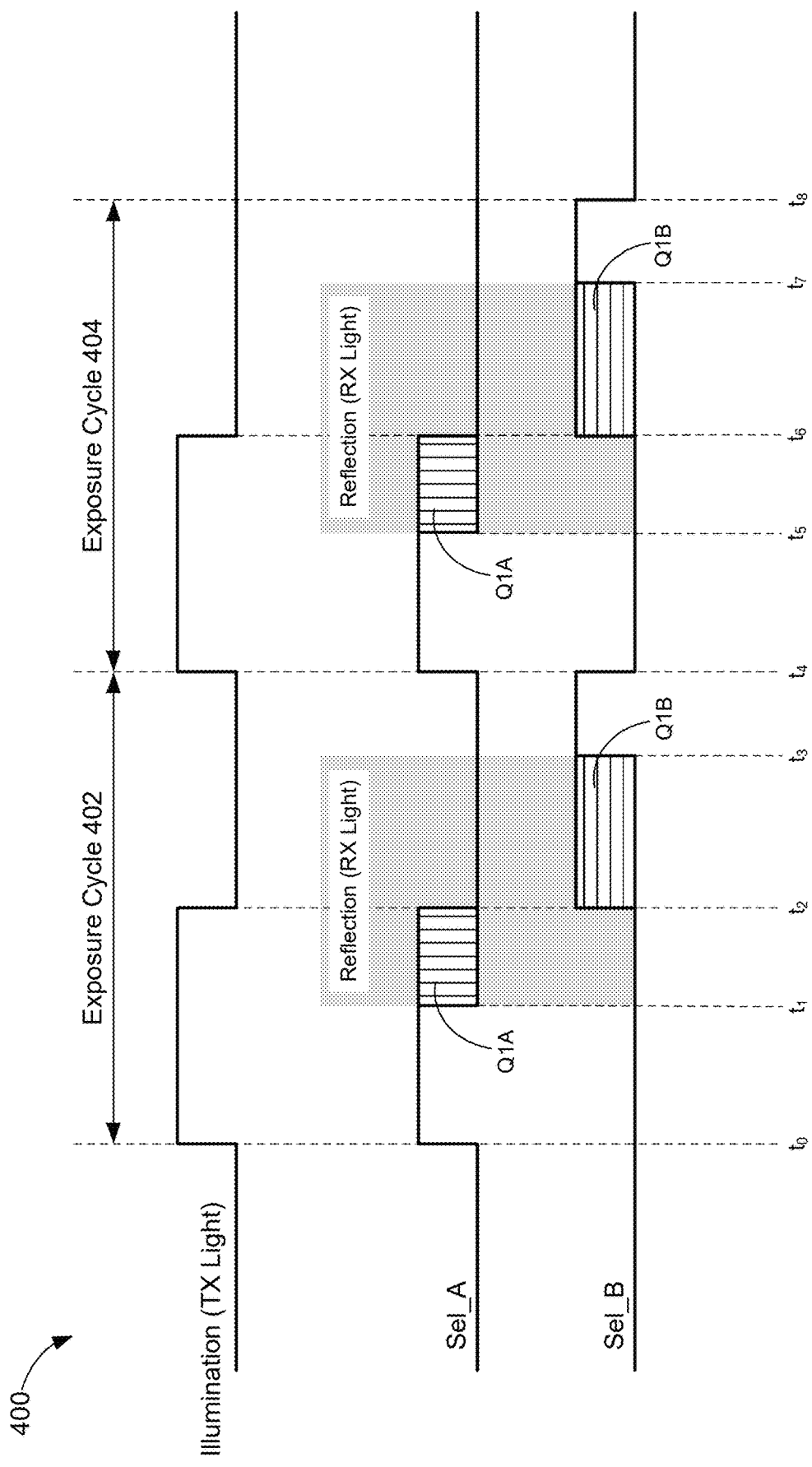
FIGS. 4A-4D show timing diagrams depicting example charge accumulation operations for a ToF sensor.

An example operation of the pixel structure 300 is described with respect to the timing diagram 400 of FIG. 4A. A pulse of light (e.g., TX light 201) is transmitted from times $t_0$ to $t_2$ and a reflection of the transmitted light (e.g., RX light 202) is returned from times $t_1$ to $t_3$. In the example of FIG. 4A, the exposure cycles are locked in phase with the pulses of light. Thus, a first exposure cycle 402 is initiated at time $t_0$ and lasts for the duration of a pulse period (e.g., from times $t_0$ to $t_4$). The first select signal Sel_A is asserted at time to and remains asserted for a portion (e.g., half) of the first exposure cycle 402 (e.g., until time $t_2$). While Sel_A is asserted, switch 322 is closed, causing charge to accumulate on storage node A. Because the reflected light is returned between times $t_1$ and $t_3$, a portion of the charge accumulated on storage node A (depicted as "Q1A" in FIG. 4A) between times $t_1$ and $t_2$ may be attributed to the reflected portion of the transmitted light, with that portion being proportional to the length of the time period between times $t_1$ and $t_2$.

Then, at time $t_2$, the first select signal Sel_A is deasserted while the second select signal Sel_B is asserted and remains asserted for the remainder (e.g., half) of the first exposure cycle 402 (e.g., until time $t_4$). While Sel_B is asserted, switch 362 is closed, causing charge to accumulate on storage node B. Because the reflected light is returned between times $t_1$ and $t_3$, a portion of the charge accumulated on storage node B (depicted as "Q1B" in FIG. 4A) between times $t_2$ and $t_3$ may be attributed to the reflected portion of the transmitted light, with that portion being proportional to the length of the time period between times $t_2$ and $t_3$. The second select signal Sel_B is subsequently deasserted, at time $t_4$, coinciding with the end of the first exposure cycle 402.

A second pulse of light is transmitted from times $t_4$ to to and a reflection of the transmitted light is returned from times $t_5$ to $t_7$. Thus, a second exposure cycle 404 is initiated at time $t_4$ and lasts for the duration of a pulse period (e.g., from times $t_4$ to $t_8$). The first select signal Sel_A is asserted at time $t_4$ and remains asserted for a portion (e.g., half) of the second exposure cycle 404 (e.g., until time $t_6$). While Sel_A is asserted, switch 322 is closed, causing additional charge to accumulate on storage node A. Because the reflected light is returned between times $t_5$ and $t_7$, a portion of the charge accumulated on storage node A between times $t_5$ and $t_7$ may be attributed to the reflected portion of the transmitted light, with that portion being proportional to the length of the time period between times $t_5$ and $t_7$.

Then, at time $t_6$, the first select signal Sel_A is deasserted while the second select signal Sel_B is asserted and remains asserted for the remainder (e.g., half) of the second exposure cycle 404 (e.g., until time $t_8$). While Sel_B is asserted, switch 362 is closed, causing additional charge to accumulate on storage node B. Because the reflected light is returned between times $t_5$ and $t_7$, a portion of the charge accumulated on storage node B between times to and t may be attributed to the reflected portion of the transmitted light, with that portion being proportional to the length of the time period between times $t_6$ and $t_7$. The second select signal Sel_B is subsequently deasserted, at time $t_8$, coinciding with the end of the second exposure cycle 404.

The operations described with respect to FIG. 4A may be repeated over a threshold number (N) of exposure cycles. For example, the threshold number of exposure cycles may be reached when a sufficient amount of charge has accumulated on the storage nodes A and/or B, as described with respect to the light receptor 230 of FIG. 2). Having achieved the threshold number of exposure cycles, the select signals Sel_A and Sel_B may be deasserted (effectively decoupling the storage nodes A and B from the photodiode 308) and the charges stored on each of the storage nodes A and B may be read out (e.g., as a "frame" of data) via a pair of signal lines 334 and 374. In the example of FIG. 3, the signal lines 334 and 374 are coupled to storage nodes A and B via "readout" switches 328 and 368, respectively. During a charge readout operation, the readout switches 328 and 368 may be closed. As a result, the charges accumulated on the storage nodes 334 and 374 may be read out via the signal lines 334 and 374, respectively, to a differential amplifier (such as the diff amp 240 of FIG. 2). The pixel structure 300 may then be reset, for example, by opening the readout switches 328 and 368 and closing a pair of "reset" switches 326 and 366. Specifically, the reset switches 326 and 366 may remain closed until the charges on the storage nodes A and B return to a reset (e.g., initialized) state.

Referring back to FIG. 2, a frame of differential data (QA and QB) may be read out from the light receptor 230 (e.g., from a plurality of pixels similar, if not identical, to the pixel structure 300 of FIG. 3) after N sensing cycles have completed. The first component of the differential data (QA) may correspond to an amount of charge (or voltage) accumulated on a first storage node (e.g., storage node A of FIG. 3) across each of the pixels in the light receptor 230. The second component of the differential data (QB) may correspond to an amount of charge (or voltage) accumulated on a second storage node (e.g., storage node B of FIG. 3) across each of the pixels in the light receptor 230.

The differential amplifier 240 receives the differential data QA and QB and outputs (e.g., amplifies) a difference ($\Delta Q_{AB}$) of the component charges QA and QB. Taking the difference between the differential data values QA and QB has the effect of cancelling out charge accumulation due to background illumination (e.g., which should be substantially equal, if not identical, on both of the storage nodes A and B). In some implementations, the ADC 250 may convert the analog difference $\Delta Q_{AB}$ to a digital value ($D_{AB}$).

The distance calculator 260 generates depth information 203 based, at least in part, on the digital value $D_{AB}$. As described above with respect to FIG. 3, the timing of the select signals Sel_A and Sel_B may be configured such that the switching between the accumulation of charge on storage node A and the accumulation of charge on storage node B occurs within a period of time during which the reflected light pulse is expected to return to the light receptor. Accordingly, the proportion of collected charge on each of the storage nodes A and B may indicate the delay between the timing of the illumination (e.g., transmission of the TX light) and the reflection (e.g., reception of the RX light). With reference for example to FIG. 4A, the amount of charge accumulated on node B will be greater than the amount of charge accumulated on node A after any number of exposure cycles have occurred. This difference in accumulated charge may indicate that the reflected light arrived later than expected, and thus the object reflecting the light may be further away.

Other factors (such as background illumination, varying reflectivity of objects, and the like) may introduce errors into the accumulation of charge on one or more of the storage nodes A or B and thus affect the accuracy of the distance calculation. To mitigate such errors, the timing controller 220 may vary the timing relationship between activation of the light source (e.g., to transmit TX light 201) and activation of the light receptor 230 (e.g., to capture RX light 202). For example, the RX_CLK may be delayed relative to the TX_CLK so that each exposure cycle of the light receptor 230 trails a corresponding pulse of TX light 201 by a phase delay (θ). More specifically, the phase delay θ may be applied to the light receptor 230 when acquiring a subsequent frame of differential data QA and QB.

Figure 4B:
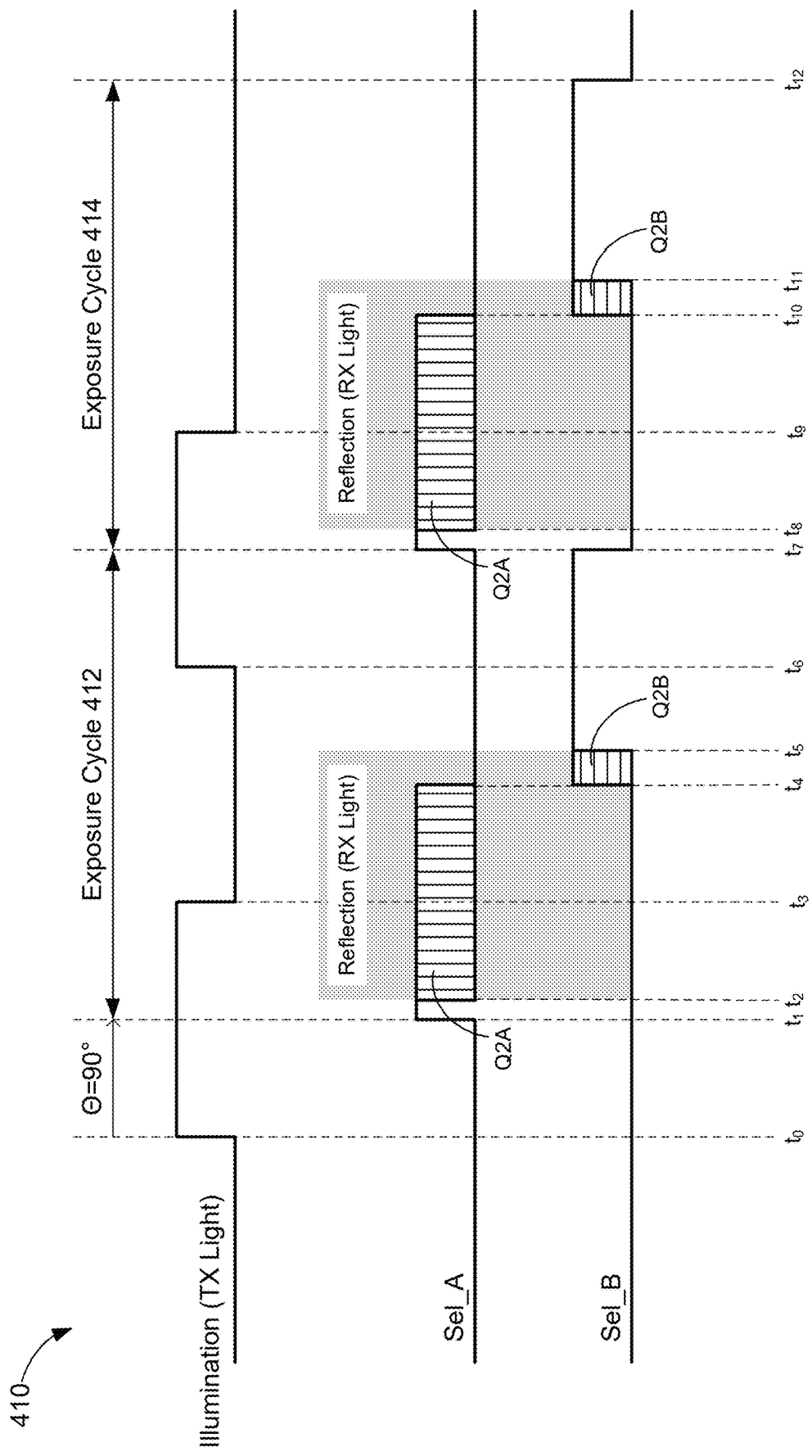

An example operation for acquiring a phase-delayed frame is described with respect to the timing diagram 410 of FIG. 4B and the pixel structure 300 of FIG. 3. A pulse of light (e.g., TX light 201) is transmitted from times $t_0$ to $t_3$ and a reflection of the transmitted light (e.g., RX light 202) is returned from times $t_2$ to $t_5$. In the example of FIG. 4B, the exposure cycles are phase-shifted by 90° relative to the pulses of light (e.g., θ=90°). Thus, a first exposure cycle 412 is initiated at time $t_1$ and lasts for the duration of a pulse period (e.g., from times $t_1$ to $t_7$). The first select signal Sel_A is asserted at time $t_1$ and remains asserted for a portion (e.g., half) of the first exposure cycle 412 (e.g., until time $t_4$). While Sel_A is asserted, switch 322 is closed, causing charge to accumulate on storage node A. Because the reflected light is returned between times $t_2$ and $t_5$, a portion of the charge accumulated on storage node A (depicted as "Q2A" in FIG. 4B) between times $t_2$ and $t_4$ may be attributed to the reflected portion of the transmitted light, with that portion being proportional to the length of the time period between times $t_2$ and $t_4$.

Then, at time $t_4$, the first select signal Sel_A is deasserted while the second select signal Sel_B is asserted and remains asserted for the remainder (e.g., half) of the first exposure cycle 412 (e.g., until time $t_7$). While Sel_B is asserted, switch 362 is closed, causing charge to accumulate on storage node B. Because the reflected light is returned between times $t_2$ and $t_5$, a portion of the charge accumulated on storage node B (depicted as "Q2B" in FIG. 4B) between times $t_4$ and $t_5$ may be attributed to the reflected portion of the transmitted light, with that portion being proportional to the length of the time period between times $t_4$ and $t_5$. The second select signal Sel_B is subsequently deasserted, at time $t_7$, coinciding with the end of the first exposure cycle 412.

A second pulse of light is transmitted from times $t_6$ to $t_9$ and a reflection of the transmitted light is returned from times $t_8$ to $t_{11}$. Thus, a second exposure cycle 414 is initiated at time $t_7$ and lasts for the duration of a pulse period (e.g., from times $t_7$ to $t_{12}$). The first select signal Sel_A is asserted at time $t_7$ and remains asserted for a portion (e.g., half) of the second exposure cycle 414 (e.g., until time $t_{10}$). While Sel_A is asserted, switch 322 is closed, causing additional charge to accumulate on storage node A. Because the reflected light is returned between times $t_8$ and $t_{11}$, a portion of the charge accumulated on storage node A between times $t_8$ and $t_{10}$ may be attributed to the reflected portion of the transmitted light, with that portion being proportional to the length of the time period between times $t_8$ and $t_{10}$.

Then, at time $t_{10}$, the first select signal Sel_A is deasserted while the second select signal Sel_B is asserted and remains asserted for the remainder (e.g., half) of the second exposure cycle 414 (e.g., until time $t_{12}$). While Sel_B is asserted, switch 362 is closed, causing additional charge to accumulate on storage node B. Because the reflected light is returned between times $t_8$ and $t_{11}$, a portion of the charge accumulated on storage node B between times $t_{10}$ and $t_{11}$ may be attributed to the reflected portion of the transmitted light, with that portion being proportional to the length of the time period between times $t_{10}$ and $t_{11}$. The second select signal Sel_B is subsequently deasserted, at time $t_{12}$, coinciding with the end of the second exposure cycle 414.

Figure 4C:
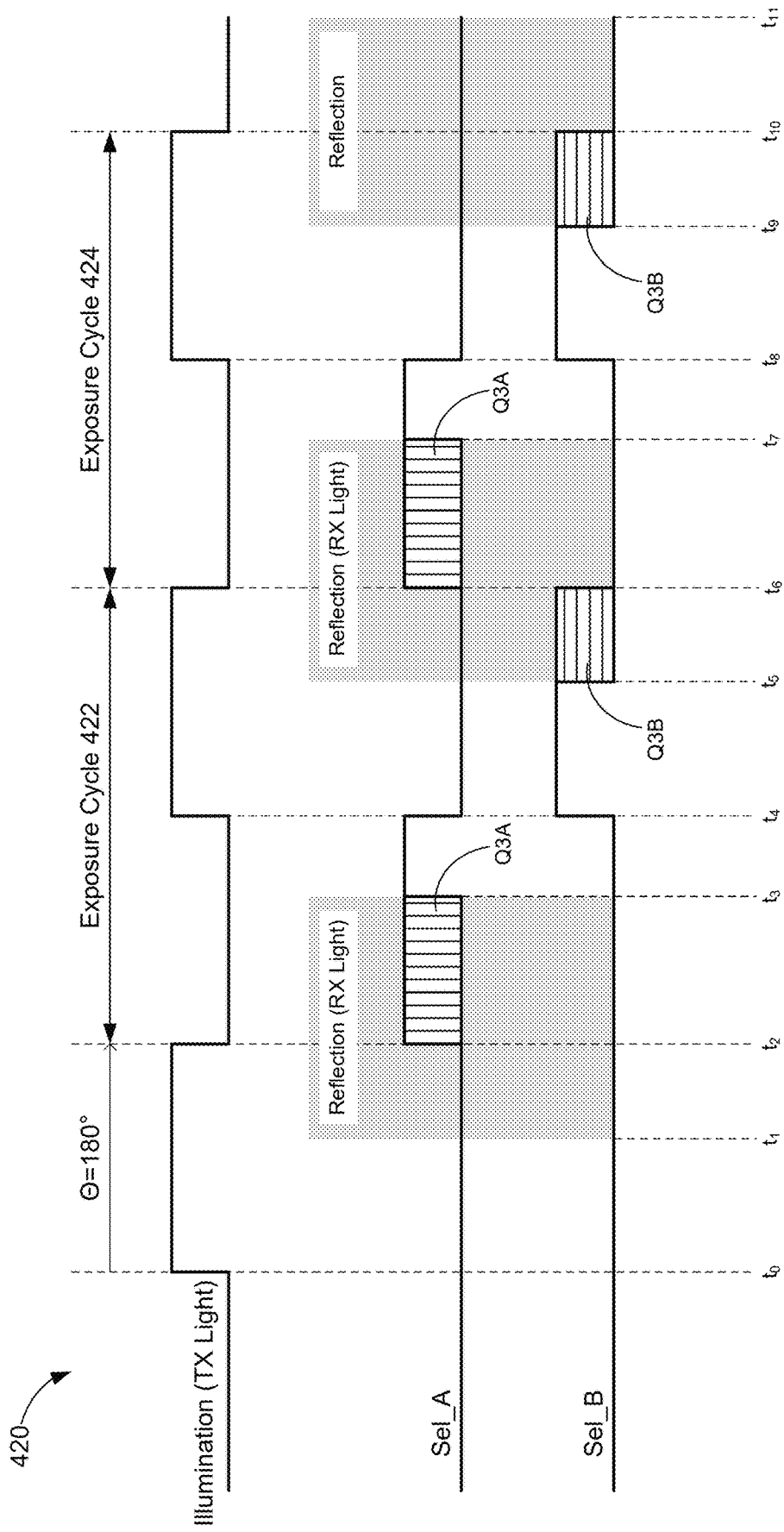

Another example operation for acquiring a phase-delayed frame is described with respect to the timing diagram 420 of FIG. 4C and the pixel structure 300 of FIG. 3. A pulse of light (e.g., TX light 201) is transmitted from times $t_0$ to $t_2$ and a reflection of the transmitted light (e.g., RX light 202) is returned from times $t_1$ to $t_3$. In the example of FIG. 4C, the exposure cycles are phase-shifted by 180° relative to the pulses of light (e.g., θ=180°). Thus, a first exposure cycle 422 is initiated at time $t_2$ and lasts for the duration of a pulse period (e.g., from times $t_2$ to $t_6$). The first select signal Sel_A is asserted at time $t_2$ and remains asserted for a portion (e.g., half) of the first exposure cycle 422 (e.g., until time $t_4$). While Sel_A is asserted, switch 322 is closed, causing charge to accumulate on storage node A. Because the reflected light is returned between times $t_1$ and $t_3$, a portion of the charge accumulated on storage node A (depicted as "Q3A" in FIG. 4C) between times $t_2$ and $t_3$ may be attributed to the reflected portion of the transmitted light, with that portion being proportional to the length of the time period between times $t_2$ and $t_3$.

Then, at time $t_4$, the first select signal Sel_A is deasserted while the second select signal Sel_B is asserted and remains asserted for the remainder (e.g., half) of the first exposure cycle 422 (e.g., until time $t_6$). While Sel_B is asserted, switch 362 is closed, causing charge to accumulate on storage node B. A second pulse of light is transmitted from times $t_4$ to $t_6$ and a reflection of the transmitted light is returned from times $t_5$ to $t_7$. Thus, a portion of the charge accumulated on storage node B (depicted as "Q3B" in FIG. 4C) between times $t_4$ and $t_6$ may be attributed to the reflected portion of the transmitted light, with that portion being proportional to the length of the time period between times $t_5$ and $t_6$. The second select signal Sel_B is subsequently deasserted, at time $t_6$, coinciding with the end of the first exposure cycle 422.

A second exposure cycle 424 is initiated at time $t_6$ and lasts for the duration of a pulse period (e.g., from times $t_6$ to $t_{10}$). The first select signal Sel_A is asserted at time $t_6$ and remains asserted for a portion (e.g., half) of the second exposure cycle 424 (e.g., until time $t_8$). While Sel_A is asserted, switch 322 is closed, causing additional charge to accumulate on storage node A. Because the reflected light is returned between times $t_5$ and $t_7$, a portion of the charge accumulated on storage node A between times $t_6$ and $t_8$ may be attributed to the reflected portion of the transmitted light, with that portion being proportional to the length of the time period between times $t_6$ and $t_7$.

Then, at time $t_8$, the first select signal Sel_A is deasserted while the second select signal Sel_B is asserted and remains asserted for the remainder (e.g., half) of the second exposure cycle 424 (e.g., until time $t_{10}$). While Sel_B is asserted, switch 362 is closed, causing additional charge to accumulate on storage node B. A third pulse of light is transmitted from times $t_8$ to $t_{10}$ and a reflection of the transmitted light is returned from times $t_9$ to $t_{11}$. Thus, a portion of the charge accumulated on storage node B between times $t_8$ and $t_{10}$ may be attributed to the reflected portion of the transmitted light, with that portion being proportional to the length of the time period between times $t_9$ and $t_{10}$. The second select signal Sel_B is subsequently deasserted, at time $t_{10}$, coinciding with the end of the second exposure cycle 424.

Figure 4D:
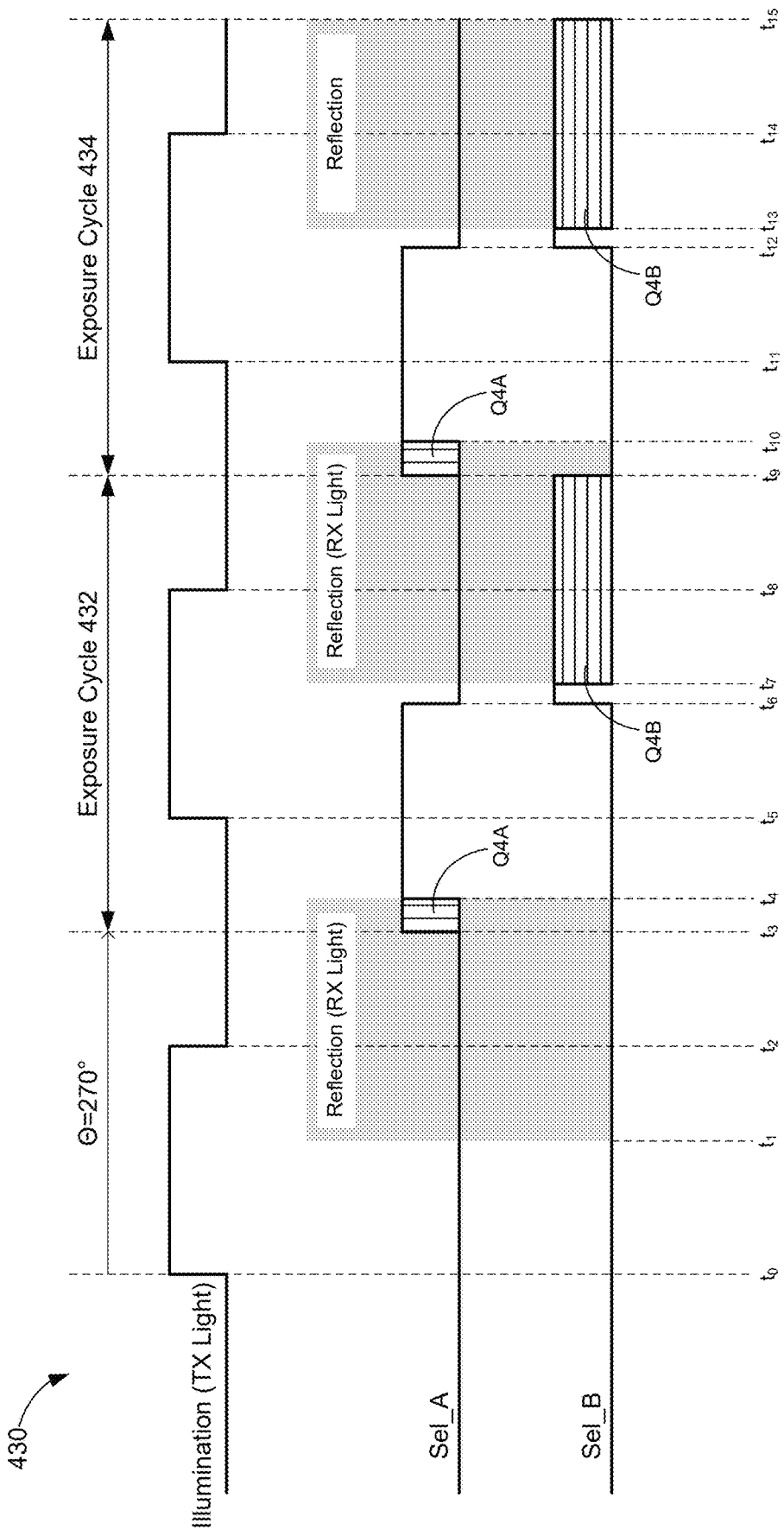
Figure 5A:
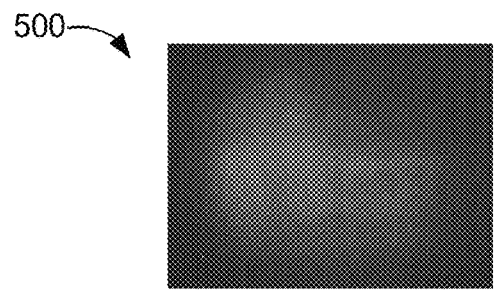
FIGS. 5A-5D show example images that may be generated by an under-display ToF sensor with respect to different phases of illumination.
Figure 5B:
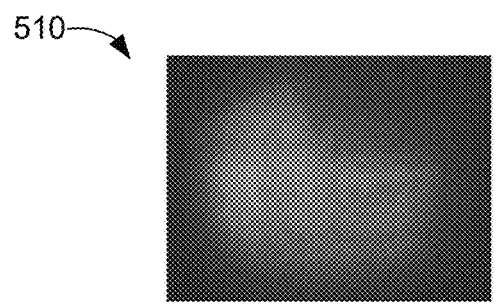
Figure 5C:
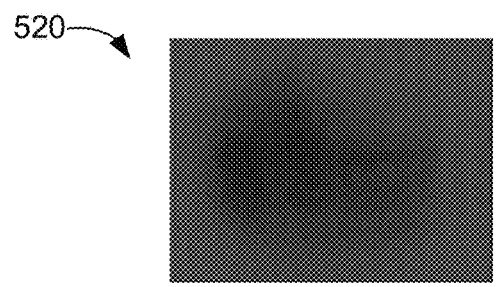
Figure 5D:
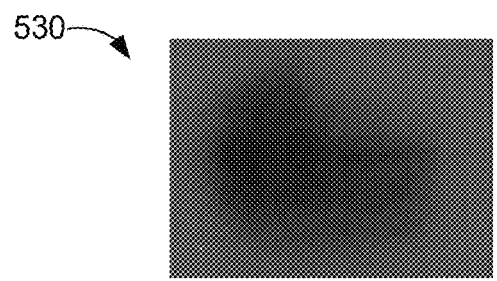

Another example operation for acquiring a phase-delayed frame is described with respect to the timing diagram 430 of FIG. 4D and the pixel structure 300 of FIG. 3. A pulse of light (e.g., TX light 201) is transmitted from times $t_0$ to $t_2$ and a reflection of the transmitted light (e.g., RX light 202) is returned from times $t_1$ to $t_4$. In the example of FIG. 4D, the exposure cycles are phase-shifted by 270° relative to the pulses of light (e.g., θ=270°). Thus, a first exposure cycle 432 is initiated at time $t_3$ and lasts for the duration of a pulse period (e.g., from times $t_3$ to $t_9$). The first select signal Sel_A is asserted at time $t_3$ and remains asserted for a portion (e.g., half) of the first exposure cycle 432 (e.g., until time $t_6$). While Sel_A is asserted, switch 322 is closed, causing charge to accumulate on storage node A. Because the reflected light is returned between times $t_1$ and $t_4$, a portion of the charge accumulated on storage node A (depicted as "Q4A" in FIG. 4D) between times $t_3$ and $t_6$ may be attributed to the reflected portion of the transmitted light, with that portion being proportional to the length of the time period between times $t_3$ and $t_4$.

Then, at time $t_6$, the first select signal Sel_A is deasserted while the second select signal Sel_B is asserted and remains asserted for the remainder (e.g., half) of the first exposure cycle 432 (e.g., until time $t_9$). While Sel_B is asserted, switch 362 is closed, causing charge to accumulate on storage node B. A second pulse of light is transmitted from times $t_5$ to $t_8$ and a reflection of the transmitted light is returned from times $t_7$ to $t_{10}$. Thus, a portion of the charge accumulated on storage node B (depicted as "Q4B" in FIG. 4D) between times $t_6$ and $t_9$ may be attributed to the reflected portion of the transmitted light, with that portion being proportional to the length of the time period between times $t_7$ and $t_9$. The second select signal Sel_B is subsequently deasserted, at time $t_9$, coinciding with the end of the first exposure cycle 432.

A second exposure cycle 434 is initiated at time $t_9$ and lasts for the duration of a pulse period (e.g., from times $t_9$ to $t_{15}$). The first select signal Sel_A is asserted at time $t_9$ and remains asserted for a portion (e.g., half) of the second exposure cycle 434 (e.g., until time $t_{12}$). While Sel_A is asserted, switch 322 is closed, causing additional charge to accumulate on storage node A. Because the reflected light is returned between times $t_7$ and $t_{10}$, a portion of the charge accumulated on storage node A between times $t_9$ and $t_{12}$ may be attributed to the reflected portion of the transmitted light, with that portion being proportional to the length of the time period between times $t_9$ and $t_{10}$.

Then, at time $t_{12}$, the first select signal Sel_A is deasserted while the second select signal Sel_B is asserted and remains asserted for the remainder (e.g., half) of the second exposure cycle 434 (e.g., until time $t_{15}$). While Sel_B is asserted, switch 362 is closed, causing additional charge to accumulate on storage node B. A third pulse of light is transmitted from times $t_{11}$ to $t_{14}$ and a reflection of the transmitted light is returned from times $t_{13}$ to $t_{15}$. Thus, a portion of the charge accumulated on storage node B between times $t_{12}$ and $t_{15}$ may be attributed to the reflected portion of the transmitted light, with that portion being proportional to the length of the time period between times $t_{13}$ and $t_{15}$. The second select signal Sel_B is subsequently deasserted, at time $t_{15}$, coinciding with the end of the second exposure cycle 434.

Referring back to FIG. 2, a second, third, and fourth frame of differential data QA and QB may be read out from the light receptor 230 for every N sensing cycles completed. The differential amplifier 240 receives the differential data QA and QB associated with each of the second, third, and fourth frames and amplifies their difference $\Delta Q_{AB}$. The ADC 250 may convert the analog difference $\Delta Q_{AB}$ to a digital value $D_{AB}$, and the distance calculator 260 may generate the depth information 203 based on the digital values $D_{AB}$ associated with each of the first, second, third, and fourth frames. For purposes of distinction, the first frame of sensor data will be referred to hereinafter as Q1A and Q1B (e.g., as shown in FIG. 4A, where θ=0°), the second frame of sensor data will be referred to as Q2A and Q2B (e.g., as shown in FIG. 4B, where θ=90°), the third frame of sensor data will be referred to as Q3A and Q3B (e.g., as shown in FIG. 4C, where θ=180°), and the fourth frame of sensor data will be referred to as Q4A ad Q4B (e.g., as shown in FIG. 4D, where θ=270°).

In some implementations, the distance calculator 260 may calculate the distance between an object and the depth sensing system 200 according to the following equation:

$$\text{distance} = K\phi$$

where K is a constant related to the speed of light and $\phi$ represents the phase shift of the RX light 202 relative to the TX light 201. In some implementations, the phase shift $\phi$ may be calculated according to the following equation:

$$\phi = \operatorname{atan}\left(\frac{(Q2A - Q2B) - (Q4A - Q4B)}{(Q1A - Q1B) - (Q3A - Q3B)}\right)$$

As described above, each of the difference operations Q4A–Q4B, Q3A–Q3B, Q2A–Q2B, and Q1A–Q1B may be computed by the differential amplifier 240 in generating the difference values $\Delta Q_{AB}$. Further, computing the quotient of the difference values has the effect of normalizing for variations in system gain (e.g., variations in the reflectivity of objects in each frame). Due to the 90° phase shift between the timing of the first frame and second frame, the denominator of the phase-shift equation (ϕ) may be referred to as the in-phase or "real" component (e.g., Real=(Q1A−Q1B)−(Q3A−Q3B)) while the numerator may be referred to as the quadrature or "imaginary" component (e.g., Imaginary=(Q2A−Q2B)−(Q4A−Q4B)). It is noted that the four different phases (e.g., 0°, 90°, 180°, and 270°) used in the examples above are for illustration purposes only. In other embodiments, the distance calculation may be performed with fewer or more phases (e.g., with different durations). In some embodiments, the timing (e.g., phase and/or duration) relationship between the light source 210 and the light receptor 230 may be determined based, at least in part, on a configuration of the distance calculator 260 (e.g., as a function of one or more neural network models 262).

The phase shift ϕ is representative of the delay (or RTT) between the RX light 202 and the TX light 201 and thus the distance between the depth sensing system 200 and an object in the sensor's field of view. Thus, some ToF sensors attempt to calculate the distance to the object by solving the arctangent function (e.g., which involves complex trigonometric operations). However, due to cost considerations, a square wave is often used for the illumination waveform (e.g., the TX light 201), rather than a sinusoidal waveform. Thus, the arctangent function can only approximate the actual phase shift ¢. More specifically, a certain amount of phase error is introduced in the phase-shift calculation using the arctangent function above. As a result, calculating the phase shift o using the arctangent function above may be computationally intensive while also yielding only approximately accurate results.

Aspects of the present disclosure recognize that the differential outputs QA and QB from the light receptor 230 may represent grayscale images of the scene illuminated by the TX light 201, where the darkness (or lightness) of certain points in the image depends on the amount of charge accumulated by corresponding pixels of the light receptor 230. FIGS. 5A-5D show example images 500-530, respectively, that may be captured by an under-display ToF sensor with respect to different phases of illumination. Each of the images 500-530 may represent a respective frame of sensor data captured by the light receptor 230. For example, the images 500-530 may be generated as a result of the charge accumulation operations 400-430, respectively, described above with respect to FIGS. 4A-4D. Thus, each of the images 500-530 may represent a frame of sensor data associated with a respective one of the phase shifts of 0°, 90°, 180°, and 270°.

As shown in FIGS. 5A-5D, darker regions of the images 500-530 may be produced by light reflected from objects that are closer to the ToF sensor whereas lighter regions of the images 500-540 may be produced by light reflected from objects that are further away. In some implementations, the distance calculator 260 may use machine learning to determine the depth information 203 based on the images captured by the light receptor 230 (such as the images 500-540) For example, the distance calculator 260 may implement one or more neural network (or deep neural network (DNN)) models 262 that are trained to infer the distances of individual points in the images 500-540 based on the darkness or lightness of the corresponding pixels. In some implementations, the depth information 203 may represent a three-dimensional (3D) depth map of one or more objects in the images 500-540.

Machine learning can be broken down into two component parts: training and inferencing. During the training phase, a machine learning system is provided with an "answer" and a large volume of raw data associated with the answer. For example, a machine learning system may be trained to recognize objects at various distances by providing the system with a large number of depth maps (e.g., the raw data) and an indication that the depth maps contain objects at particular distances (e.g., the answer). The machine learning system may then analyze the raw data to "learn" a set of rules that can be used to describe the answer. For example, the system may perform statistical analysis on the raw data to determine a common set of features (e.g., the rules) that can be associated with objects of a given distance (such as the darkness of a pixel). During the inferencing phase, the machine learning system may apply the rules to new data to generate answers or inferences about the data. For example, the system may analyze a depth map and determine, based on the learned rules, that the depth map includes one or more objects at known distances.

Deep learning is a particular form of machine learning in which the training phase is performed over multiple layers, generating a more abstract set of rules in each successive layer. Deep learning architectures are often referred to as artificial neural networks due to the way in which information is processed (e.g., similar to a biological nervous system). For example, each layer of the deep learning architecture may be composed of a number of artificial neurons. The neurons may be interconnected across the various layers so that input data (e.g., the raw data) may be passed from one layer to another. More specifically, each layer of neurons may perform a different type of transformation on the input data that will ultimately result in a desired output (e.g., the answer). The interconnected framework of neurons may be referred to as a neural network model. Thus, the neural network models 262 may include a set of rules that can be used to describe a particular object or feature (such as the distance of a particular point or pixel in a depth map).

As described above, the electronic display 270 may introduce noise or interference into the images captured by the light receptor 230, which may affect the accuracy of the distance calculations performed by the distance calculator 260. In some embodiments, the distance calculator 260 may further use machine learning to filter such noise or interference from the images associated with the sensor data QA and QB. For example, the distance calculator 260 may implement one or more neural network models 262 that are trained to recognize how the electronic display 270 transmits or disperses the RX light 202 that is incident upon the light receptor 230, and thus infer how the image would appear in the absence of the electronic display 270. In other words, the neural network models 262 may produce a filtered image from which the distances of objects (e.g., depth information 203) can be more accurately determined or calculated.

Figure 6:
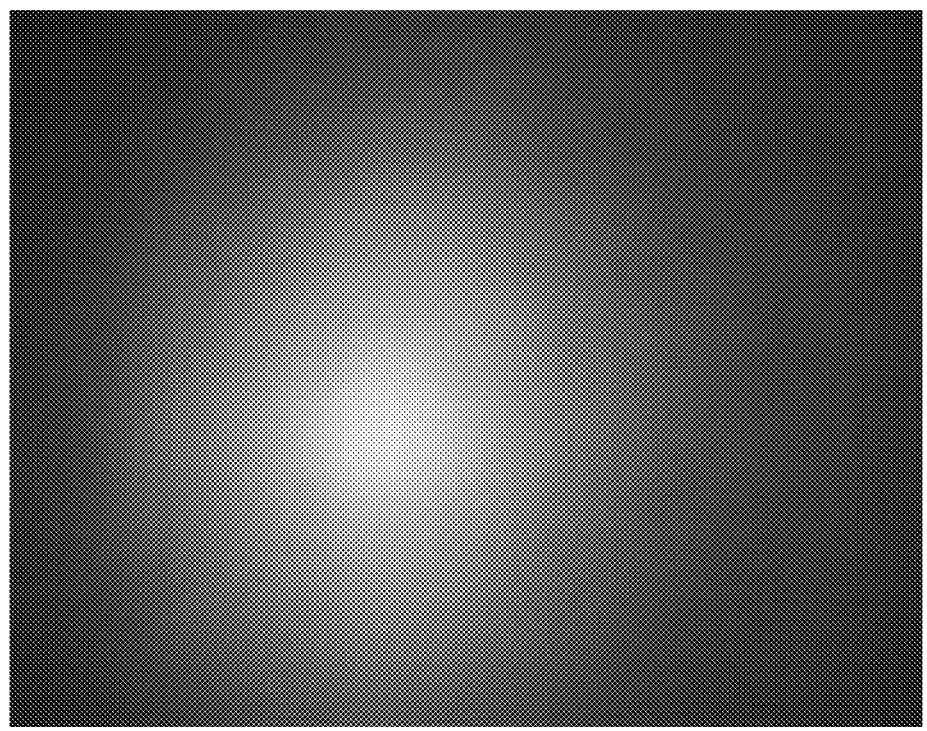
FIG. 6 shows an example image that may be captured by an array of optical sensing elements disposed behind an electronic display.

FIG. 6 shows an example image 600 that may be captured by an array of optical sensing elements disposed behind an electronic display. With reference for example to FIG. 2, the image 600 may be captured by the light receptor 230 based on light passing through the display 270. As shown in FIG. 6, the image 600 includes a concentric pattern of alternating dark and light rings—or "Newton's rings." The ring-like pattern is created as a result of the reflected light (e.g., which may be produced by a narrow-band laser) constructively and/or destructively interfering within a lens or other optical surface disposed above the optical sensing elements. The electronic display also introduces noise and interference in the image 600. For example, light incident on the display may pass through holes, gaps, or empty spaces between display pixels and/or sub-pixels which creates at least some of the noise or interference in the image 600. Further, each point of incident light is spread horizontally and vertically into a different position (e.g., as a point spread function), and in a similar fashion across the image 600, which may result in noticeable distortion.

In some embodiments, the one or more of the neural network models 262 may be trained to filter or remove the pattern of noise or interference exhibited in the image 600. For example, during the training process, the neural network may be provided with a large volume of images captured of a scene through the display as well as a large volume of "clean" images captured of the same scene but without the display present. In this manner, the neural network may be trained to not only recognize the pattern of noise or interference attributed to the display, but how to interpret the underlying image with the removal of such noise or interference. The training process may produce neural network models 262 that may be used by the distance calculator 260 to filter or calibrate images associated with the sensor data QA and QB received from the light receptor 230. More specifically, the distance calculator 260 may implement the neural network models 262 to remove or eliminate the noise, interference, distortion, or other artifacts, resulting in a filtered image that appears as if captured (by the light receptor 230) in the absence of the electronic display 270.

Figure 7:
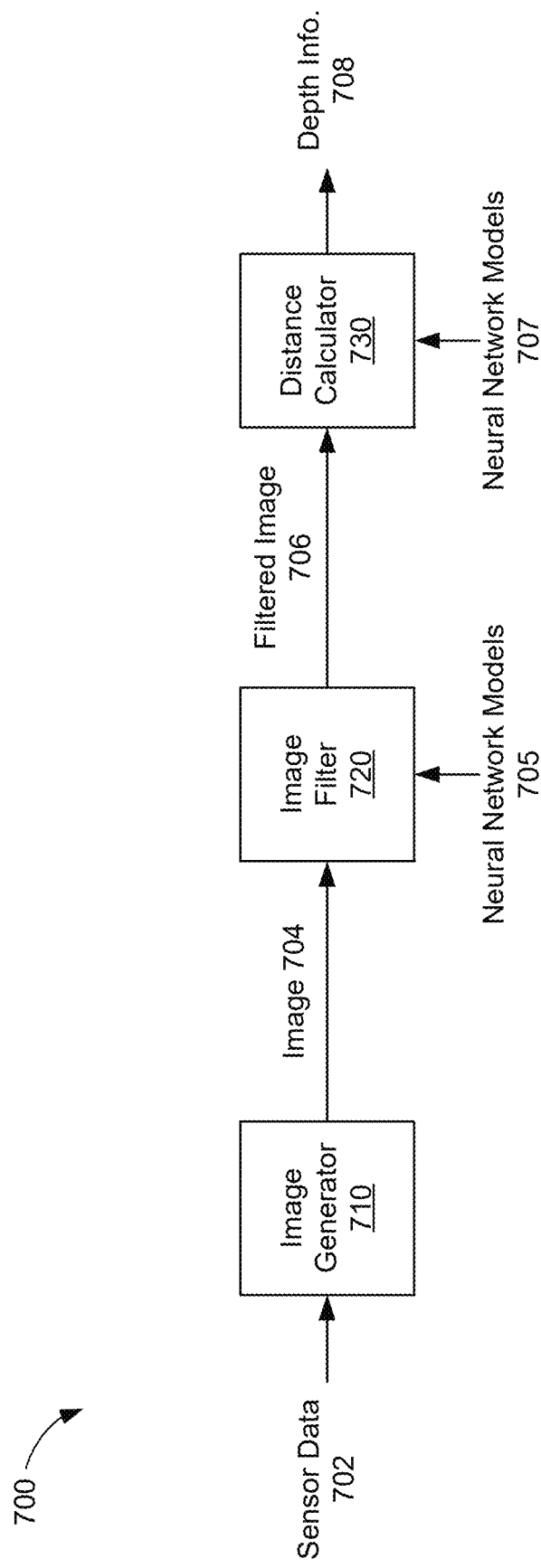
FIG. 7 shows a block diagram of a depth measuring system, in accordance with some embodiments.

FIG. 7 shows a block diagram of a depth measuring system 700, in accordance with some embodiments. The depth measuring system 700 may be included in, or implemented by, an under-display ToF sensor such as, for example, the ToF sensor 110 of FIG. 1. More specifically, the depth measuring system 700 may be configured to generate depth information 708 about an object in the sensor's FOV based on sensor data 702 received from one or more light receptors (such as the light receptor 230 of FIG. 2) disposed behind an electronic display (such as the display 270). The depth measuring system 700 includes an image generator 710, an image filter 720, and a distance calculator 730.

Figure 8B:
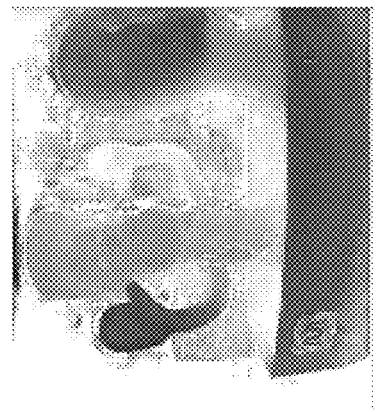
FIG. 8B shows an example image after filtering for noise and interference using one or more neural network models.
Figure 8A:
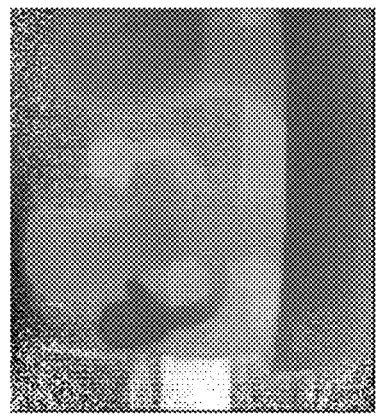
FIG. 8A shows an example image that may be generated by a ToF sensor disposed behind an electronic display.

The image generator 710 may receive one or more frames of sensor data 702 from the one or more light receptors (not shown for simplicity) and generate a two-dimensional (2D) image 704 based on the received sensor data 702. As described above with respect to FIG. 2, the differential sensor data QA and QB output by the light receptor 230 may be combined to form a grayscale image (such as the images 500-540 shown in FIGS. 5A-5D). FIG. 8A shows an example image 800 that may be generated by a ToF sensor disposed behind an electronic display. The image 800 may be one example of the image 704 generated by the image generator 710. As shown in FIG. 8A, the image 800 includes a substantial amount of noise or interference, such as the Newton's rings depicted in FIG. 6, due to the reflected light being partially occluded by the electronic display. As a result, objects in the image 800 may appear fuzzy or grainy, with relatively little contrast in the darkness (or lightness) between different points in the image 800.

The image filter 720 is configured to filter or process the image 704, using one or more neural network models 705, to produce a filtered image 706. As described above with respect to FIG. 6, the neural network models 705 may be trained to recognize the noise or interference in an image that is attributed to light passing through the electronic display and to reinterpret the image without such noise or interference present. FIG. 8B shows an example image 810 after filtering for noise and interference using one or more neural network models. The image 810 may be one example of the filtered image 706 generated by the image filter 720 using the neural network modules 705. More specifically, the image 810 may correspond to the image 800 after filtering for noise or interference caused by the electronic display. As shown in FIG. 8B, much of the noise and interference (particularly the Newton's rings) that was in the original image 800 has been filtered or removed in the image 810. As a result, objects in the image 810 appear sharper and more defined, with significantly higher contrast in the darkness (or lightness) between different points in the image 810.

The distance calculator 730 is configured to determine depth information 708 about one or more objects in the filtered image 706. As described above with respect to FIG. 2, the darkness (or lightness) of certain points in the filtered image 706 can be attributed to the amount of charge accumulated by corresponding pixels of the light receptor 230. As a result, darker regions of the image 706 may be attributed to light reflecting off objects that are closer to the ToF sensor whereas lighter regions of the image 706 may be attributed to light reflected off objects that are further away. Thus, the distance calculator 730 may determine the distances of objects based, at least in part, on the degree, intensity, or spread of darkness at various points in the filtered image 706. In some implementations, the distance calculator 730 may use one or more neural network models 707 in determining the depth information 708. For example, the neural network models 707 may be trained to recognize the distances of individual points in the filtered image 706 based on the darkness or lightness of the corresponding pixels.

In some embodiments, the depth information 708 may be used for biometric authentication (such as facial recognition). For example, the depth information 708 may represent a 3D depth map of a user's face. As such, the depth information 708 may be used to verify whether a user of an electronic device is an authorized user of the device. In some aspects, the 3D depth map may be combined with a 2D spatial image (of the same scene). For example, as described above with reference to FIG. 2, the light receptor 230 is configured to capture 2D grayscale images of a scene in the ToF sensor's FOV. Aspects of the present disclosure recognize that each point in the 2D image represents a measure of reflectivity of all points in the scene. In contrast, each point in the 3D depth map represents a distance from the sensor to a respective point in the scene. By combining, the 3D depth map with a 2D spatial image of the same scene, aspects of the present disclosure may produce a more detailed or accurate authentication image. In some aspects, the 2D spatial image also may be filtered, for example by the image filter 720, to remove noise or interference caused by the electronic display.

In some other embodiments, the depth information 708 may be combined with 2D spatial images to generate 3D visualizations of one or more objects in the scene. For example, a 2D spatial image of an object may be superimposed or projected on the surfaces of a 3D depth map or model of the object to produce a textured rendering that can be rotated, manipulated, or otherwise viewed from different angles. Still further, in some embodiments, the depth information 708 may be combined with sensor data acquired from other sensors of an electronic system to provide even more sensing modalities. For example, some electronic systems may include cameras that are capable of detecting light in the visible spectrum (including the red, green, and blue (RGB) color components of the light). Such cameras may be referred to as RGB cameras. In some aspects, color information can be extracted from the images captured by an RGB camera and projected onto 3D surfaces associated with a 3D depth map to provide even more detailed or realistic renderings.

Further, some electronic systems may include event cameras that respond to local changes in brightness. Unlike shutter-based cameras (which implement rolling shutters or global shutters for image capture), each pixel in an event camera independently responds to changes in brightness. Specifically, if the brightness detected by any individual pixel exceeds a threshold brightness level, the pixel generates an event. In some aspects, sensor data from an event camera (representing an event) may be used to trigger or otherwise active the ToF sensor. This may reduce the overall power consumption of the electronic system, for example, by maintaining the ToF sensor in a low-power state until an object enters the sensor's FOV. In some implementations, other sensors of the electronic system (such as RGB cameras, event cameras, and the like) also may be disposed behind the electronic display. Thus, the images or sensor data acquired from the other sensors also may be filtered, for example by the image filter 720, to remove noise or interference caused by the electronic display.

Figure 9:
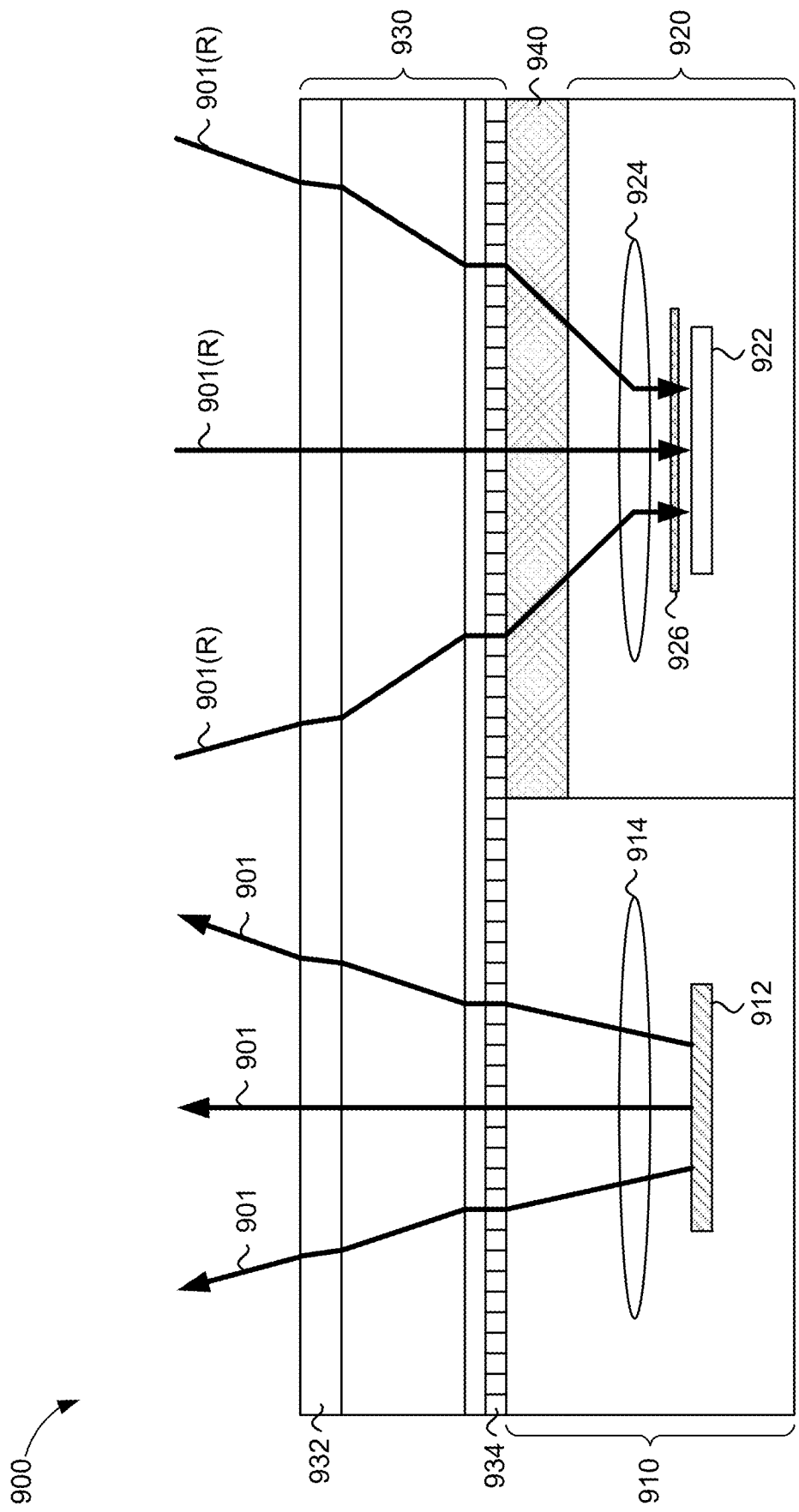
FIG. 9 shows a cross-sectional view of an example depth sensing system, in accordance with some embodiments.

FIG. 9 shows a cross-sectional view of an example depth sensing system 900, in accordance with some embodiments. In some embodiments, the depth sensing system 900 may be one example of the depth sensing system 200 of FIG. 2. The depth sensing system 900 includes a light source 910, a light receptor 920, and an electronic display 930. The light source 910, light receptor 920, and electronic display 930 may be example implementations of the light source 210, the light receptor 230, and the display 270, respectively, of FIG. 2.

The electronic display 930 may be formed from multiple display layers including, but not limited to, a display surface 932 and an emissive layer 934. The display surface 932 may be formed from any translucent material that facilitates the transmission of light. In some embodiments, the electronic display 930 may be a porous display implementing OLED or micro-LED display technology. More specifically, the emissive layer 934 may include a plurality of display pixels and/or subpixels separated by holes, gaps, or empty spaces therebetween. In the example of FIG. 9, the holes, gaps, or empty spaces are depicted as vertical lines disposed across the length of the emissive layer 934. In some embodiments, the holes, gaps, or empty spaces between display pixels and/or subpixels may be larger in a region of the electronic display 930 overlapping the light source 910 and/or light receptor 920 than in other regions of the display 930. For example, the light source 910 and/or light receptor 920 may be disposed behind a top or bottom edge of the electronic display 930 where the change in pixel density is less noticeable.

The light source 910 is disposed behind or under the electronic display 930 and configured to transmit periodic bursts of light 901 through the display 930. The light source 910 includes a light emitter 912 and a lens 914. The light emitter 910 may be any device or component capable of emitting light including, but not limited to, lasers and/or LEDs. In some embodiments, the light emitter 910 may be configured to emit light in the near infrared (NIR) spectrum. The lens 914 is configured to focus the light 901 from the light emitter 910 in a direction perpendicular to the electronic display 930. As shown in FIG. 9, the transmitted light 901 propagates through the various layers of the display 930 before exiting the display surface 932. At least some of the light 901 is obstructed by the display pixels and/or subpixels in the emissive layer 934. However, in some embodiments, the amount of light 901 transmitted through the display 930 may be increased by increasing the sizes of the holes, gaps, or empty spaces between the display pixels and/or subpixels that overlap the light source 910.

The light receptor 920 is also disposed behind or under the electronic display 930 and configured to detect reflected light 901(R) from one or more objects on the other side of the display 930. The light receptor 920 includes an array of optical sensing elements 922, a lens 924, and an optical filter 926. The array of optical sensing elements 922 may be any device capable of detecting light including, but not limited to, photodiodes, CMOS image sensor arrays, and/or CCD arrays. In some embodiments, the light receptor 920 may be configured to detect light having the same wavelength as the transmitted light 901 (e.g., in the NIR spectrum). As shown in FIG. 9, the reflected light 901(R) propagates through the various layers of the display 930 before exiting the emissive layer 934, where at least some of the reflected light 901(R) is obstructed by the display pixels and/or subpixels. However, in some embodiments, the amount of reflected light 901(R) transmitted through to the light receptor 920 may be increased by increasing the sizes of the holes, gaps, or empty spaces between the display pixels and/or subpixels that overlap the light receptor 920.

Aspects of the present disclosure recognize that the reflected light 901(R) may diffuse or spread as the light travels through the holes, gaps, or empty spaces between display pixels and/or subpixels in the emissive layer 934. In some embodiments, a diffusion filter 940 may be disposed between the electronic display 930 and the light receptor 920 to reduce or eliminate the spread of the reflected light 901(R) exiting the display 930. As shown in FIG. 9, the diffusion filter 940 may be coupled or attached to the underside of the electronic display 930. The lens 924 is configured to focus the reflected light 901(R) exiting the display 930 onto the array of optical sensing elements 922. In some embodiments, the lens 924 and/or diffusion filter 940 may be configured to mitigate Newton's rings in the images captured by the optical sensing elements 922. The optical filter 926 may be configured to filter out (or transmit) specific wavelengths of light. For example, the optical filter 926 may be used to reject background illumination and/or prevent undesired wavelengths of light from entering the array of optical sensing elements 922 or otherwise interfering with the reflected light 901(R).

The array of optical sensing elements 922 may convert the detected light 901(R) to sensor data that can be used to determine depth information for one or more objects in the FOV of the depth sensing system 900. For example, the sensor data may correspond to an amount of charge accumulated on each pixel of the array 922. The sensor data may be provided to a distance calculator (such as the distance calculator 260 and/or the depth measuring system 700 of FIGS. 2 and 7, respectively) which may determine the depth information based, at least in part, on one or more neural network models. Although not shown, for simplicity, the depth sensing system 900 may also include a timing controller (such as the timing controller 220 of FIG. 2) to synchronize the timing of the light source 910 with the light receptor 920.

Figure 10:
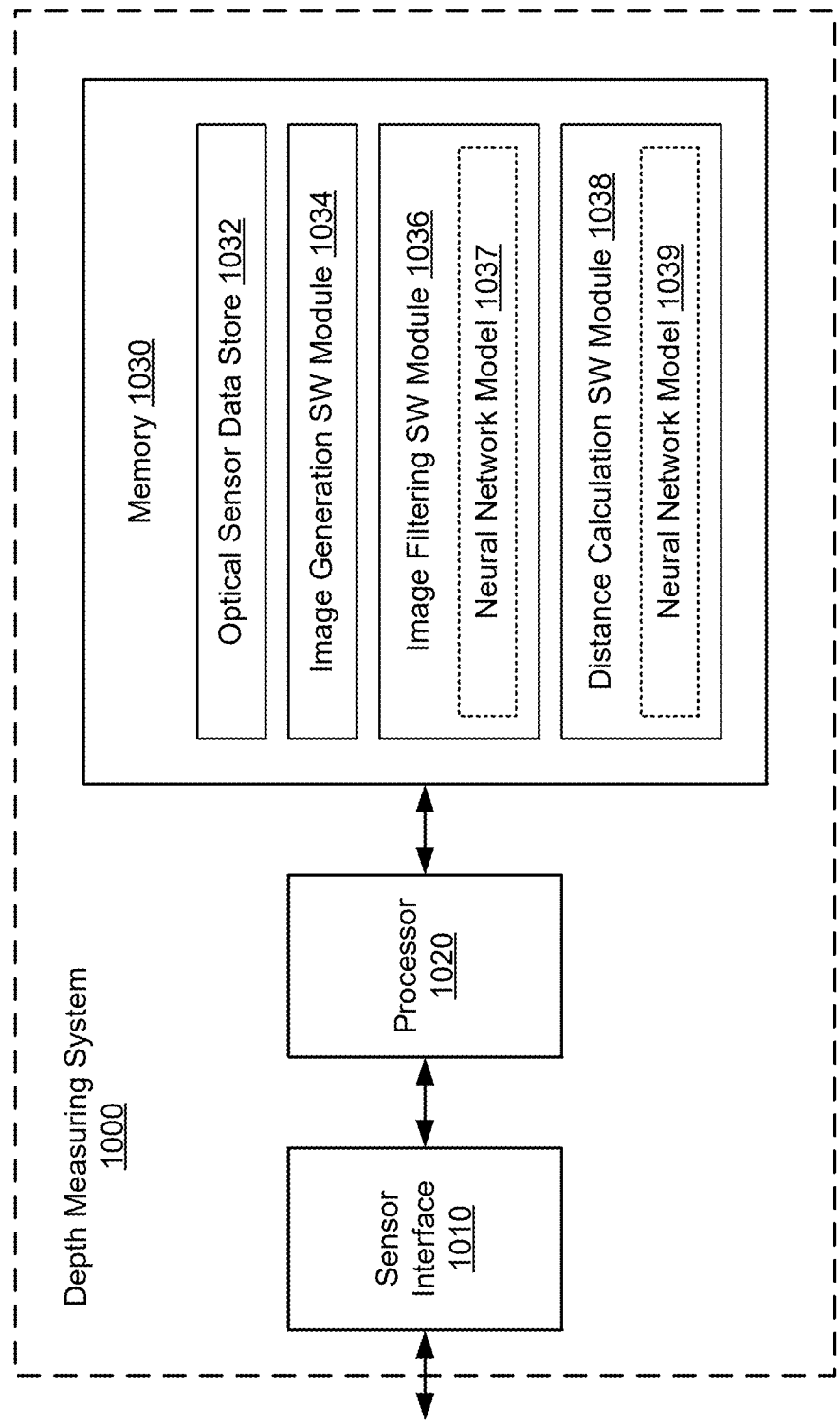
FIG. 10 shows a block diagram of depth measuring system, in accordance with some embodiments.

FIG. 10 shows a block diagram of a depth measuring system 1000, in accordance with some implementations. In some implementations, the depth measuring system 1000 may form at least part of a depth sensing system such as, for example, the depth sensing system 200 of FIG. 2. For example, the depth measuring system 100 may be an embodiment of the distance calculator 260 of FIG. 2 and/or the depth measuring system 700 of FIG. 7. The depth measuring system 1000 may include a sensor interface 1010, a processor 520, and a memory 530.

The sensor interface 1010 may be used to communicate with one or more optical sensors of a depth sensing system (such as the light receptor 230 of FIG. 2). For example, the sensor interface 1010 may transmit activation signals to, and receive sensor data from, an array of optical sensing elements to capture or acquire light reflected by one or more objects in a field of view (FOV) of the depth sensing system. In some implementations, the reflected light may be partially occluded by an electronic display associated with the depth sensing system. Thus, the optical sensors may detect only the portion of the reflected light that passes through (gaps in) the electronic display.

The memory 1030 includes an optical sensor data store 1032 to store sensor data received from the one or more optical sensors. The memory 1030 may further include a non-transitory computer-readable medium (e.g., one or more nonvolatile memory elements, such as EPROM, EEPROM, Flash memory, a hard drive, and so on) that may store at least the following software (SW) modules:

- an image generation SW module 1034 to generate an image associated with the one or more objects in the FOV of the depth sensing system based on the received sensor data;
- an image filtering SW module 1036 to filter noise or interference from the image, the image filtering SW module 1036 including:
  - a neural network model 1037 trained to infer the noise or interference from the image based on the transmissivity of the electronic display; and
- a distance calculation SW module 1038 to determine distances of the one or more objects in the image, the distance calculation SW module 1038 including:
  - a neural network model 1039 trained to infer the distances of individual points in the image based on the darkness or lightness of each point.

Each software module includes instructions that, when executed by the processor 1020, cause the depth sensing system 1000 to perform the corresponding functions. The non-transitory computer-readable medium of memory 1030 thus includes instructions for performing all or a portion of the operations described below with respect to FIG. 11.

The processor 1020 may be any suitable one or more processors capable of executing scripts or instructions of one or more software programs stored in the depth sensing system 1000 (e.g., within the memory 1030). For example, the processor 1020 may execute the image generation SW module 1034 to generate an image associated with the one or more objects in the FOV of the depth sensing system based on the received sensor data. The processor 1020 may further execute the image filtering SW module 1036 to filter noise or interference from the image. In executing the image filter SW module 1036, the processor 1020 may apply the neural network model 1037 to infer the noise or interference from the image based on the transmissivity of the electronic display. The processor 1020 also may execute the distance calculation SW module 1038 to determine distances of the one or more objects in the image. In executing the distance calculation SW module 1038, the processor 1020 may apply the neural network model 1039 to infer the distances of individual points in the image based on the darkness or lightness of each point.

Figure 11:
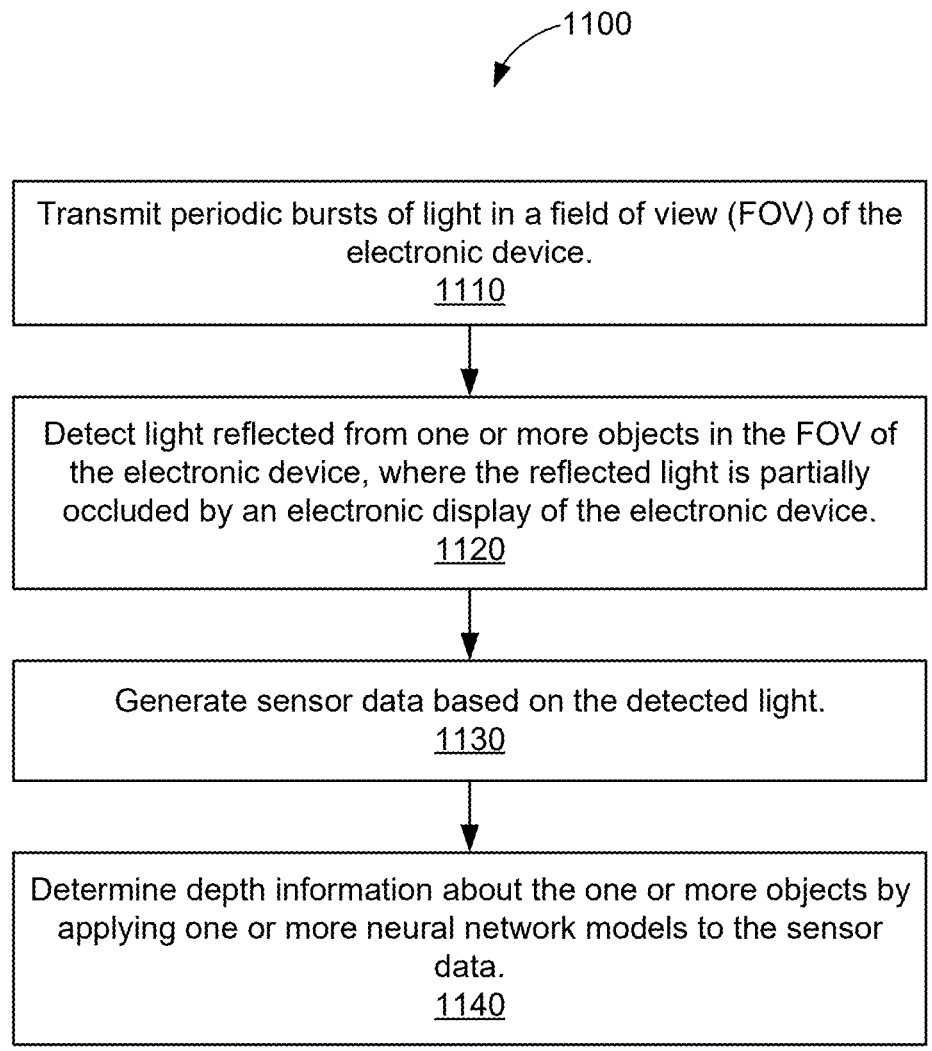
FIG. 11 shows an illustrative flowchart depicting an example depth sensing operation, in accordance with some implementations.

FIG. 11 shows an illustrative flowchart depicting an example depth sensing operation 1100, in accordance with some implementations. In some implementations, the depth sensing operation 1100 may be performed by an electronic device. With reference for example to FIG. 2, the electronic device may correspond to, or include, the depth sensing system 200.

The electronic device transmits periodic bursts of light in a field of view (FOV) of the electronic device (1110). In some implementations, the light may be transmitted or emitted by a light source of the electronic device. For example, the light source may include one or more illumination mechanisms including, but not limited to, lasers, light-emitting diodes (LEDs), and/or any other mechanisms capable of emitting wavelengths of light in the visible spectrum, the infrared spectrum, or the ultraviolet spectrum. In some aspects, the light source may be disposed behind an electronic display of the electronic device. In some other aspects, the light sources may be adjacent the electronic display.

The electronic device detects light reflected from one or more objects in the FOV of the electronic device, where the reflected light is partially occluded by an electronic display of the electronic device (1120). In some implementations, the reflected light may be detected by a light receptor disposed behind the electronic display. For example, the light receptor may include an array of pixel sensors including, but not limited to, photodiodes, CMOS image sensor arrays, CCD arrays, and/or any other sensors capable of detecting wavelengths of light in the visible spectrum, the infrared spectrum, or the ultraviolet spectrum. The light receptor may be located in close proximity of the light source to ensure that the distance traveled by the transmitted light is substantially equal to the distance traveled by the reflected light.

The electronic device generates sensor data based on the detected light (1130). In some implementations, the light receptor may comprise an array of optical sensing elements or "pixels" operated (electrically) in a global shutter configuration. During a given exposure cycle (e.g., while the global shutter is open), the light receptor converts the reflected light to an electric charge or current that is stored on one or more storage elements within each pixel of the array. The charge may be accumulated over a number of exposure cycles so that a sufficiently high voltage differential can be read from the storage elements. As described above with reference to FIG. 3, a frame of sensor data may be read out from the light receptor after a number (N) of sensing cycles have completed.

The electronic device further determines depth information about the one or more objects by applying one or more neural network models to the sensor data (1140). In some embodiments, the electronic device may use one or more neural network models to filter the noise or interference from the images captured by the light receptor. For example, the neural network models may be trained to infer noise or interference from the images based on the occlusion of the reflected light by the electronic display. In some implementations, the electronic device may also use one or more neural network models to determine depth information about the one or more objects in the FOV of the electronic device. For example, the neural network models may be trained to infer the distances of individual points in the images based on the darkness or lightness of each point.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A depth sensing system comprising:
an electronic display;
a light source configured to transmit periodic bursts of light in a field of view (FOV) of the depth sensing system;
an array of optical sensing elements disposed behind the electronic display and configured to detect light reflected from one or more objects in the FOV of the depth sensing system, wherein the reflected light is partially occluded by the electronic display; and
a depth map generator configured to receive sensor data based on the detected light from the array of optical sensing elements and determine depth information about the one or more objects by applying one or more neural network models to the received sensor data.

2. The depth sensing system of claim 1, further comprising:
a lens disposed between the electronic display and the array of optical sensing elements, wherein the lens is configured to focus the reflected light on the array of optical sensing elements.

3. The depth sensing system of claim 1, further comprising:
an optical filter disposed between the electronic display and the array of optical sensing elements, wherein the optical filter is configured to block one or more wavelengths of light.

4. The depth sensing system of claim 3, wherein the light source is configured to emit a first wavelength of light for each of the periodic bursts, and wherein the optical filter is configured to allow only the first wavelength of light to pass through to the array of optical sensing elements.

5. The depth sensing system of claim 4, wherein the first wavelength of light comprises a wavelength in the near-infrared (NIR) spectrum.

6. The depth sensing system of claim 1, wherein the light source is also disposed behind the electronic display.

7. The depth sensing system of claim 1, wherein the depth map generator is to determine the depth information by:
generating an image of the one or more objects based on the received sensor data; and
filtering noise or interference from the image based on the application of the one or more neural network models, wherein the noise or interference is based at least in part on a transmissivity of the electronic display.

8. The depth sensing system of claim 7, wherein the depth map generator is to determine distances of the one or more objects in the image based on the application of the one or more neural network models.

9. The depth sensing system of claim 7, wherein the transmissivity of the electronic display is based at least in part on partially transmissive gaps between display pixels in the array of optical sensing elements.

10. The depth sensing system of claim 9, wherein the partially transmissive gaps are larger in a region of the electronic display that overlaps the array of optical sensing elements than in other regions of the electronic display.

11. A method of depth sensing performed by an electronic device, comprising:
transmitting periodic bursts of light in a field of view (FOV) of the electronic device;
detecting light reflected from one or more objects in the FOV of the electronic device, wherein the reflected light is partially occluded by an electronic display of the electronic device;
generating sensor data based on the detected light; and
determining depth information about the one or more objects by applying one or more neural network models to the sensor data.

12. The method of claim 11, further comprising:
filtering the reflected light to prevent one or more wavelengths of the reflected light from being detected.

13. The method of claim 12, wherein the filtering comprises:
allowing only one of a plurality of wavelengths of the reflected light to be detected.

14. The method of claim 11, wherein the determining of the depth information comprises:
generating an image of the one or more objects based on the sensor data; and
filtering noise or interference from the image based on the application of the one or more neural network models, wherein the noise or interference is based at least in part on a transmissivity of the electronic display.

15. The method of claim 14, wherein the determining of the depth information further comprises:

determining distances of the one or more objects in the image based on the application of the one or more neural network models.

16. The method of claim 14, wherein the transmissivity of the electronic display is based at least in part on partially transmissive gaps between display pixels in an array of optical sensing elements.

17. A depth measuring system comprising:
a processing system; and
a memory storing instructions that, when executed by the processing system, causes the depth measuring system to:
receive sensor data based on light reflected from one or more objects, wherein the reflected light is partially occluded by an electronic display;
generate an image of the one or more objects based on the received sensor data; and
determine depth information about the one or more objects by applying one or more neural network models to the image.

18. The depth measuring system of claim 17, wherein execution of the instructions for determining the depth information causes the depth measuring system to:
filter noise or interference from the image based on the application of the one or more neural network models, wherein the noise or interference is based at least in part on the transmissivity of the electronic display.

19. The depth measuring system of claim 18, wherein execution of the instructions for determining the depth information further causes the depth measuring system to:
determine distances of the one or more objects in the image based on the application of the one or more neural network models.

20. The depth measuring system of claim 18, wherein the transmissivity of the electronic display is based at least in part on partially transmissive gaps between display pixels in an array of optical sensing elements.

* * * * *